US009299199B2

(12) United States Patent

Popa

(10) Patent No.: US 9,299,199 B2

(45) Date of Patent: Mar. 29, 2016

(54) SYNCHRONIZATION OF RECORDS OF DUTY STATUS BETWEEN A VEHICLE AND A STATIONARY UNIT

(71) Applicant: Razvan Popa, Mosnita Noua (RO)

(72) Inventor: Razvan Popa, Mosnita Noua (RO)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/699,422

(22) Filed: Apr. 29, 2015

(65) Prior Publication Data

US 2015/0317845 A1 Nov. 5, 2015

(30) Foreign Application Priority Data

Apr. 30, 2014 (EP) .................................... 14465505

(51) Int. Cl.

*G01M 17/00* (2006.01)
*G06F 7/00* (2006.01)
*G06F 19/00* (2011.01)
*G07C 5/00* (2006.01)
*G07C 5/02* (2006.01)

(52) U.S. Cl.

CPC . *G07C 5/008* (2013.01); *G07C 5/02* (2013.01)

(58) Field of Classification Search

CPC ...... G07C 5/008; G07C 5/0808; G07C 5/085; G07C 2205/02; G01M 17/007
USPC ........................................................ 701/31.5
See application file for complete search history.

(56) References Cited

U.S. PATENT DOCUMENTS

2006/0064470 A1 3/2006 Sargent et al.
2009/0271779 A1* 10/2009 Clark ................ G06F 17/30174 717/171
2010/0120373 A1 5/2010 Wheatley et al.

FOREIGN PATENT DOCUMENTS

EP 1 783 693 A1 5/2007
EP 2 169 631 A2 9/2009
EP 2 458 564 5/2012
WO WO 2008/050136 A1 5/2008
WO WO2008050136 A1 * 5/2008

* cited by examiner

*Primary Examiner* — Maceeh Anwari

(74) *Attorney, Agent, or Firm* — Cozen O'Connor

(57) ABSTRACT

A system for synchronizing records of duty status (RODS) information of a vehicle with a stationary unit includes: at least one mobile unit, and a stationary unit configured to store RODS transmitted by the mobile unit. The mobile unit is configured to generate RODS, store the generated RODS, and transmit RODS to the stationary unit. The mobile unit is further configured to transmit a newly generated first RODS to the stationary unit in an initial synchronization step of a synchronization process of the RODS stored on the mobile unit and the RODS stored on the stationary unit. The mobile unit is further configured to generate a checksum of the first RODS after transmission of the first RODS to the stationary unit and to transmit only the checksum of the first RODS to the stationary unit in a subsequent synchronization step.

11 Claims, 1 Drawing Sheet

SYNCHRONIZATION OF RECORDS OF DUTY STATUS BETWEEN A VEHICLE AND A STATIONARY UNIT

BACKGROUND OF THE INVENTION

1. Field of the Invention

The invention relates to the field of automotive applications. In particular, the invention relates to a system for synchronizing records of duty status (RODS) information of a vehicle with a stationary unit.

2. Description of the Related Art

There are many vehicle applications that record data in an electronic on board recorder, EOBR, for example, and synchronize the data from the EOBR with a stationary unit, for example a Backend Server. The data synchronization process requires transmission of data between the vehicle and the stationary unit. In general, an EOBR device may be referred to as a mobile unit.

An EOBR device installed in a vehicle may, in particular, be used by a driver to record duty status activities, which may be referred to as records of duty status, RODS. Such an EOBR device may be configured for usage by a multitude of different operators, i.e., drivers. The EOBR may store, for each driver who used this EOBR, the operator-specific RODS data history for a specified first period of time, for example a few days, such as 10 to 15 days. The data stored in the EOBR may be required to be available for roadside inspection.

A driver RODS is a time ordered list of duty status records. Each of these duty status records may include at least one or more of the following information: record identifier (unique identifier that is issued for the duty status record when it is recorded), start time (timestamp when the duty status starts), end time (timestamp when the duty status ends), duty status value (possible values are: D—driving, ON—on-duty not driving, SB—time spent in sleeper berth, OFF—off-duty) name of the nearest populated place (city) where the duty status has been started, state name of the place where the duty status has been started, vehicle position (latitude/longitude) when the duty status starts, total vehicle odometer when the duty status has been started, annotation text containing remarks added by the driver (optional).

The stationary unit, i.e., the backend server, collects RODS data from EOBR devices from a multitude of vehicles and stores the RODS data in a database for a specified second period of time, which is longer than the first period of time, for example a few months, particularly 6 months. The driver RODS database from the stationary unit can be accessed by a managing operator. The managing operator may generate hours of service, HOS, reports based on the driver RODS.

In general, the mobile unit and the stationary unit synchronize the RODS data cyclically. Such a synchronization process requires transmission of data from the mobile unit to the stationary unit and vice versa.

SUMMARY OF THE INVENTION

An object of the invention is to provide a system for synchronizing records of duty status (RODS) information of a vehicle with a stationary unit that reduces the amount of data transmission between the mobile unit and the stationary unit.

According to an aspect of the invention, in a system for synchronizing records of duty status, RODS, information of a vehicle with a stationary unit is provided. The system comprises at least one mobile unit and a stationary unit for storing RODS transmitted by the mobile unit. The mobile unit is configured to generate RODS, store the generated RODS, and transmit RODS to the stationary unit. The stationary unit is configured to store RODS transmitted by the mobile unit. The mobile unit is further configured to transmit a newly generated first RODS to the stationary unit in an initial synchronization step of a synchronization process of the RODS stored on the mobile unit and the RODS stored on the stationary unit. The mobile unit is further configured to generate a checksum of the first RODS after transmission of the first RODS to the stationary unit and to transmit only the checksum of the first RODS to the stationary unit in a subsequent synchronization step of the synchronization process. The checksum is generated according to a first checksum generation algorithm.

A particular mobile unit or EOBR device and the stationary unit communicate via a communication link. The communication link may at least partially comprise a data link via an interne connection using a specific communication protocol. The communication link may be a wireless data link, for example a GPRS, UMTS, or LTE communication channel. The communication channel may, in particular, provide a continuous or permanent communication link between the mobile unit and the stationary unit during an operating time of the mobile unit, i.e., while the vehicle with the EOBR is travelling.

Usually, the mobile unit is taken into operation at the start of a driver's work shift. When taking into operation the mobile unit the driver logs in such that a driver ID is loaded and the RODS are assigned to this driver ID. During the work shift the driver remains logged in the mobile unit and records the duty activities for the respective work shift. At the end of the work shift the driver logs out from the mobile unit and the mobile unit stores the driver RODS after driver logout and makes the RODS available to the driver when he or she logs in next time at the start of the subsequent work shift.

When a driver creates a new duty status activity or a new RODS, the mobile unit will append a new associated duty status record in the driver RODS database of the mobile unit and will upload it to the stationary unit via the communication link so that the driver RODS database from the stationary unit can be updated with the newly created RODS from the mobile unit. Thus, all the RODS created by a driver during a work shift are uploaded and updated in both mobile unit RODS database and stationary unit RODS database.

For a particular driver it may be required that the RODS at the mobile unit and the RODS at the stationary unit contain the same duty records for a specified period of past time, for example for the last 10 to 15 days. This requirement is in general realized by the synchronization process, which is uploading of newly generated RODS from the mobile unit to the stationary unit and storing these RODS, as they are received, in the database of the stationary unit.

The stationary unit may be configured such that a managing operator can modify a RODS received from the mobile unit and stored in the stationary unit. If this modification happens while the respective driver is logged in a mobile unit that is connected to the stationary unit, i.e., there is an established communication connection between the mobile unit and the stationary unit, then the modified duty record is transferred to the mobile unit immediately so that the RODS database of the mobile unit is also updated. If the modification happens when the respective driver is not logged in to a mobile unit, or the mobile unit is shut down or switched off or the communication link between the mobile unit and the stationary unit is not established, the modified duty record cannot be transmitted to the mobile unit. For the latter case, a cyclic synchronization process is implemented during which the driver RODS of the mobile unit and the driver RODS of the stationary unit are synchronized. The synchronization usually occurs at each driver login event at a mobile unit so as to ensure that the duty status records from the mobile unit database have the same content as the duty status records from the stationary unit.

The comparison of the RODS usually occurs for the specified period of time for which the RODS have to be stored in the mobile unit, i.e., for the past 10 to 15 days in the example above. The comparison is usually carried out in the stationary unit and therefore requires transmitting the RODS from the mobile unit to the stationary unit at every login event of a driver. Such a synchronization process creates a big overhead of data to be transmitted from the mobile unit to the stationary unit as one entry in the RODS database of the mobile unit is transferred multiple times to the stationary unit, namely a first time when initially created and afterwards at every driver login event during the synchronization process. One entry in the RODS database may comprise about 100 to 200 bytes of information (800 to 1600 bits in case of binary representation of data).

The method according to the invention reduces the amount of data for being transferred from the mobile unit to the stationary unit during a synchronization process.

This reduction of the amount of transferred or transmitted data between the mobile unit and the stationary unit during the synchronization process is an achieved by generating a checksum of every entry in the RODS database of the mobile unit and after the initial transmission of the complete RODS only the checksum is transferred.

A checksum is a datum generated from an initial block of information, for example from a sequence of bits. In general, the checksum is characterized in that it contains many fewer bits than the initial block of data. Thus, when transmitting the checksum instead of the complete block of data, fewer bits need to be transmitted and the data transmission costs can be reduced.

A checksum is generated by a checksum generation algorithm. When generating a checksum from a block of information multiple times with the same checksum generation algorithm, the checksum is identical every time it is generated. When the block of information, i.e., a sequence of bits, changes, then the checksum changes too.

For the purposes of the invention, any checksum generation algorithm can be used that meets the requirement that the generated checksum contains fewer bits than the initial block of information (input data for the checksum generation algorithm). Each entry of the RODS database of the mobile unit is taken as input data for the checksum generation algorithm and a corresponding checksum is generated.

Depending on the checksum generation algorithm that is used, a considerable reduction of the transmitted data may be achieved. The checksum of an entry in the RODS database may require 1 to 4 bytes (8 to 32 bits in case of binary representation) and may thus lead to a reduction of the transmitted data of about 90% or more compared to transmitting the complete RODS from the mobile unit.

After creation of a new entry into the RODS database of the mobile unit, the complete RODS is transmitted to the stationary unit and the checksum is created by the mobile unit. In a subsequent synchronization, only the checksum is transmitted to the stationary unit.

The stationary unit generates the checksum of a received RODS by itself. In a subsequent synchronization process, the mobile unit transmits the checksums of the RODS already transmitted. The stationary unit compares its own checksums of the entries in the RODS database of the stationary unit with the received checksums. When identifying a difference of checksums of similar RODS, the respective RODS is completely transmitted to the mobile unit and the mobile unit replaces its RODS database entry with the RODS received from the stationary unit. Different checksums may result from a modification carried out by the managing operator in the RODS of the stationary unit.

In other words, the RODS from the stationary unit overrules the RODS from the mobile unit.

According to an embodiment of the invention, the mobile unit is configured to store RODS of a multitude of operators and identify an operator according to an operator identity.

According to a further embodiment of the invention, the mobile unit is configured to start the synchronization process after a login-event of an operator.

According to a further embodiment of the invention, the mobile unit and the stationary unit are configured to synchronize only the RODS of an operator logged on to the mobile unit during the synchronization process.

According to a further embodiment of the invention, the stationary unit is configured to modify a RODS stored on the stationary unit.

This modification may be carried out by a managing operator managing the stationary unit.

According to a further embodiment of the invention, the stationary unit is configured to generate a checksum of the RODS stored on the stationary unit according to the first checksum generation algorithm.

According to a further embodiment of the invention, the stationary unit is configured to compare the generated checksum of the first RODS and the checksum of the first RODS transmitted by the mobile unit, and, if these checksums are not identical, transmit the first RODS from the stationary unit to the mobile unit.

The stationary unit compares the checksum received from the mobile unit and the calculated checksum. If these checksums are identical, then no further steps are required for the respective RODS. If the checksums are not identical, the RODS from the stationary unit is transmitted to the mobile unit and overwrites the RODS at the mobile unit. Of course such a comparison requires that the same checksum generation algorithm is used.

According to a further embodiment of the invention, the mobile unit is configured to overwrite the first RODS in case the stationary unit transmits a modified first RODS.

According to a further embodiment of the invention, the mobile unit comprises a transmission element adapted to wirelessly transmit RODS to the stationary unit.

The transmission element is further configured to receive incoming data from the stationary unit. The transmission element may in particular be a module adapted to transmit data via a GPRS, UMTS, LTE, or any other suitable wireless communication interface.

According to a further embodiment of the invention, the mobile unit is mounted to a vehicle.

According to a further embodiment of the invention, the stationary unit is configured to receive RODS from a multitude of mobile units.

These and other aspects of the present invention will become apparent from and elucidated with reference to the exemplary embodiments described hereinafter.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the present invention will now be described in the following, with reference to the following drawings, in which.

DETAILED DESCRIPTION OF THE PRESENTLY PREFERRED EMBODIMENTS

Figure 1:
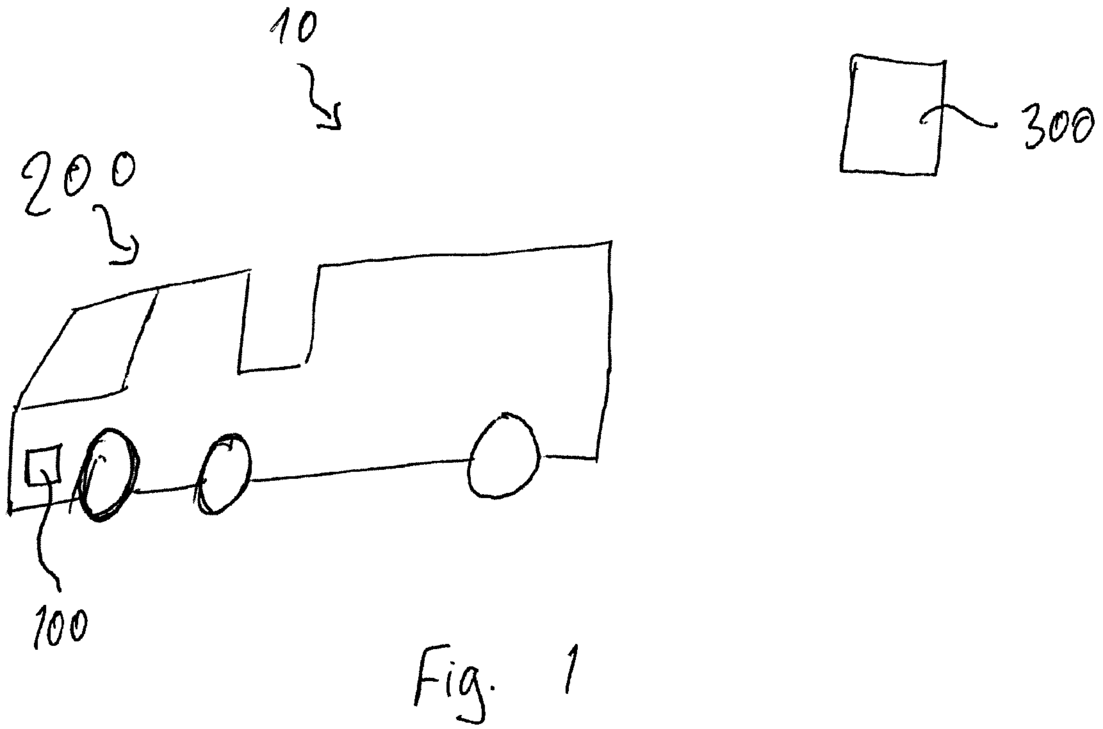
FIG. 1 schematically illustrates a system according to an exemplary embodiment of the invention.

The illustration in the accompanying drawings is schematic and not to scale. In different drawings, similar or identical elements or steps are provided with the same reference numerals.

The following detailed description is merely exemplary in nature and is not intended to limit the application and uses.

FIG. 1 illustrates a system 10 for synchronizing records of duty status, RODS, information of a vehicle 200 with a stationary unit 300. The system 10 comprises a mobile unit 100 and the stationary unit 300.

The mobile unit 100 is mounted to the vehicle 200 and is operated by a driver of the vehicle before starting to travel with the vehicle. Initially, the driver creates a RODS in the mobile unit 100 and this RODS is transmitted to the stationary unit. Further, the mobile unit generates a checksum of every RODS. In subsequent synchronization processes of the RODS between the mobile unit 100 and the stationary unit 300, the mobile unit 100 transmits only the checksums of the RODS to the stationary unit. In case one entry in the RODS database of the stationary unit has been modified in the meantime, the checksums of the respective RODS are not identical and the respective RODS is transmitted from the stationary unit 300 to the mobile unit 100 and overwrites the RODS at the mobile unit 100.

It should be noted that the system 10 may comprise a multitude of mobile units 100 mounted to different vehicles.

Figure 2:
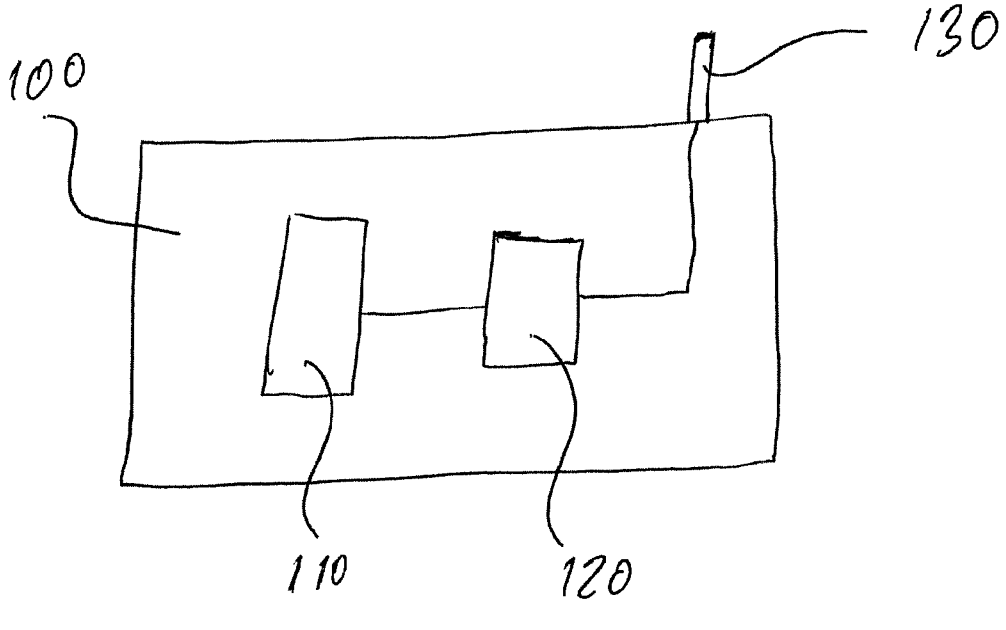
FIG. 2 schematically illustrates a mobile unit of a system according to an exemplary embodiment of the invention.

FIG. 2 shows a mobile unit 100 with a storage element 110, a control element 120, and a transmission element 130.

The storage element 110 is adapted to store the RODS database, i.e., each individual RODS for a predefined number of past days.

The control element 120 is adapted to generate the checksum for every entry in the RODS database. The checksums may be stored in the storage element 110. Additionally, when transmitting the checksums to the stationary unit 300, an identifier may be transmitted, which identifies the RODS a checksum belongs to.

The control element 120 is further adapted to read the RODS database and to control the transmission element 130. The transmission element 130 transmits the data provided by the control element 120 to the stationary unit 300.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system (10) for synchronizing records of duty status, RODS, information of a vehicle with a stationary unit, comprising:

at least one mobile unit (100) configured to generate RODS, store the generated RODS, and transmit RODS; and a stationary unit (300) configured to receive and store RODS transmitted by the at least one mobile unit, wherein the at least one mobile unit (100) is further configured to transmit a newly generated first RODS to the stationary unit in an initial synchronization step of a synchronization process of synchronizing the RODS stored on the at least one mobile unit and the RODS stored on the stationary unit, wherein the at least one mobile unit (100) is further configured to generate a checksum of the first RODS after transmission of the first RODS to the stationary unit and to transmit only the checksum of the first RODS to the stationary unit in a subsequent synchronization step of the synchronization process, wherein the stationary unit (300) is configured to generate a checksum of the RODS received from the at least one mobile unit (100), wherein in the event of any discrepancy between the checksum generated by the at least one mobile unit (100) and the checksum generated by the stationary unit (300), the RODS from the stationary unit overrules the RODS from the mobile unit (100), and wherein the checksum is generated according to a first checksum generation algorithm.

2. The system (10) according to claim 1, wherein the at least one mobile unit is configured to store RODS of a multitude of operators and to identify an operator according to an operator identity.

3. The system (10) according to claim 1, wherein the at least one mobile unit is configured to start the synchronization process after a login-event of an operator.

4. The system (10) according to claim 3, wherein the at least one mobile unit and the stationary unit are configured to synchronize only the RODS of an operator logged on to the at least one mobile unit during the synchronization process.

5. The system (10) according to claim 1, wherein the stationary unit (300) is configured to modify a RODS stored on the stationary unit.

6. The system (10) according to claim 1, wherein the stationary unit (300) is configured to generate a checksum of the RODS stored on the stationary unit according to the first checksum generation algorithm.

7. The system (10) according to claim 6, wherein the stationary unit (300) is configured to compare the generated checksum of the first RODS and the checksum of the first RODS transmitted by the at least one mobile unit and, if these checksums are not identical, transmit the first RODS from the stationary unit to the at least one mobile unit.

8. The system (10) according to claim 7,
wherein the at least one mobile unit is configured to overwrite the first RODS in case the stationary unit transmits a modified first RODS.

9. The system (10) according to claim 1,
wherein the at least one mobile unit (100) has a transmission element (130) configured to wirelessly transmit RODS to the stationary unit (300).

10. The system (10) according to claim 1,
wherein the at least one mobile unit (100) is mounted to a vehicle (200).

11. The system (10) according to claim 1,
wherein the stationary unit (300) is configured to receive RODS from a multitude of mobile units (100).

* * * * *